(12) United States Patent
Holbrook et al.

(10) Patent No.: US 6,226,086 B1
(45) Date of Patent: *May 1, 2001

(54) THICKNESS MONITORING (75) Inventors: Mark Burton Holbrook; William George Beckmann, both of Perthshire; Simon Eric Hicks; Christopher David Wicks Wilkinson, both of Glasgow, all of (GB)

(73) Assignee: Vorgem Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,224
(22) PCT Filed: Aug. 11, 1997
(86) PCT No.: PCT/GB97/02139
  § 371 Date: Apr. 19, 1999
  § 102(e) Date: Apr. 19, 1999
(87) PCT Pub. No.: WO98/07002
  PCT Pub. Date: Feb. 19, 1998

(30) Foreign Application Priority Data

Aug. 10, 1996 (GB) ............... 9616853

(51) Int. Cl.[7] ............... G01B 11/06
(52) U.S. Cl. ............... 356/381; 356/382
(58) Field of Search ............... 356/381, 382, 356/355, 357, 369; 118/688; 204/192.13, 192.33; 250/339.08, 339.11

(56) References Cited

U.S. PATENT DOCUMENTS

| 5,227,861 | * | 7/1993 | Nishizawa et al. | 356/357 |
| 5,493,401 | * | 2/1996 | Horie et al. | 356/382 |
| 5,523,840 | * | 6/1996 | Nishizawa et al. | 356/357 |
| 5,581,354 | * | 12/1996 | Hassbjer | 356/381 |

FOREIGN PATENT DOCUMENTS

| 0 545 738 | 7/1992 | (EP) . |
| 631106 A2 | 12/1994 | (EP) . |
| 644399 A2 | 3/1995 | (EP) . |
| 650030 A2 | 4/1995 | (EP) . |
| 690288 A2 | 1/1996 | (EP) . |
| 735 565 A1 | 2/1996 | (EP) . |
| 2 257 507 | 5/1992 | (GB) . |

OTHER PUBLICATIONS

S.E. Hicks et al., "Reflectance modeling for in situ dry etch monitoring of bulk $SiO_2$ and III–V multilayer structures," Journal of Vaccuum Science & Technology, Part B, vol. 12, No. 6, Nov. '94, pp. 3306–3310.

* cited by examiner

Primary Examiner—Hoa Q. Pham
(74) Attorney, Agent, or Firm—Ratner & Prestia (57) ABSTRACT

The thickness of a thin layer structure is monitored during deposition or etching. The structure is illuminated with a predetermined energy (visible or near visible light or x-ray) and a modified parameter of the illumination is measured, which may be reflection intensity, transmission intensity or polarisation. The detected signal is examined by shape recognition techniques using adaptive digital filters.

18 Claims, 12 Drawing Sheets

*Prior Art*

Fig. 1

Prior Art

Fig. 2

Prior Art

Fig. 3

*Prior Art*

Prior Art

THICKNESS MONITORING

This application is the U.S. national phase application of PCT International Application No. PCT/GB97/02139 filed Aug. 11, 1997.

This invention relates to the field of thin film deposition and/or removal, and more particularly to improved monitoring of thickness during deposition or removal using time domain image recognition applied to optical reflectometry.

Thin films are commonly used to modify surface properties. Typical applications include the coating of optical components to improve their light transmission or reflection properties, the coating of composite materials to improve adhesion behaviour, and the coating of semiconductors to introduce insulation layers or layers with specific electronic properties. Typically these thin films will have thicknesses in the range of 1 nm to 5 $\mu$m and are placed on top of a substrate material which has a very much greater thickness. Frequently the films are structured in stacks, one on top of the other. Such stacks may consist of three or four individual films up to structures containing hundreds of films.

For adequately carrying out the function for which they have been designed these films frequently have to be deposited or, once having been deposited, have to be removed wholly or partially with very great precision. This deposition or removal is frequently carried out under conditions of a vacuum using heated elements and gases or gases excited into the plasma state. Such processes generate considerable quantities of noise in electrical, thermal, optical, vibrational and radio frequency categories.

Equipment that is measuring and/or controlling the thickness and/or rate of deposited or removed film or films therefore has to operate under arduous conditions in the presence of many categories of interfering noised signals. These interfering noise signals frequently upset the measurement technique resulting in processes that are inadequately controlled.

This invention improves the procedure of in-process determination of the thickness of deposited or removed film under these inherently noisy and difficult conditions.

BACKGROUND OF THE INVENTION

Figure 1:
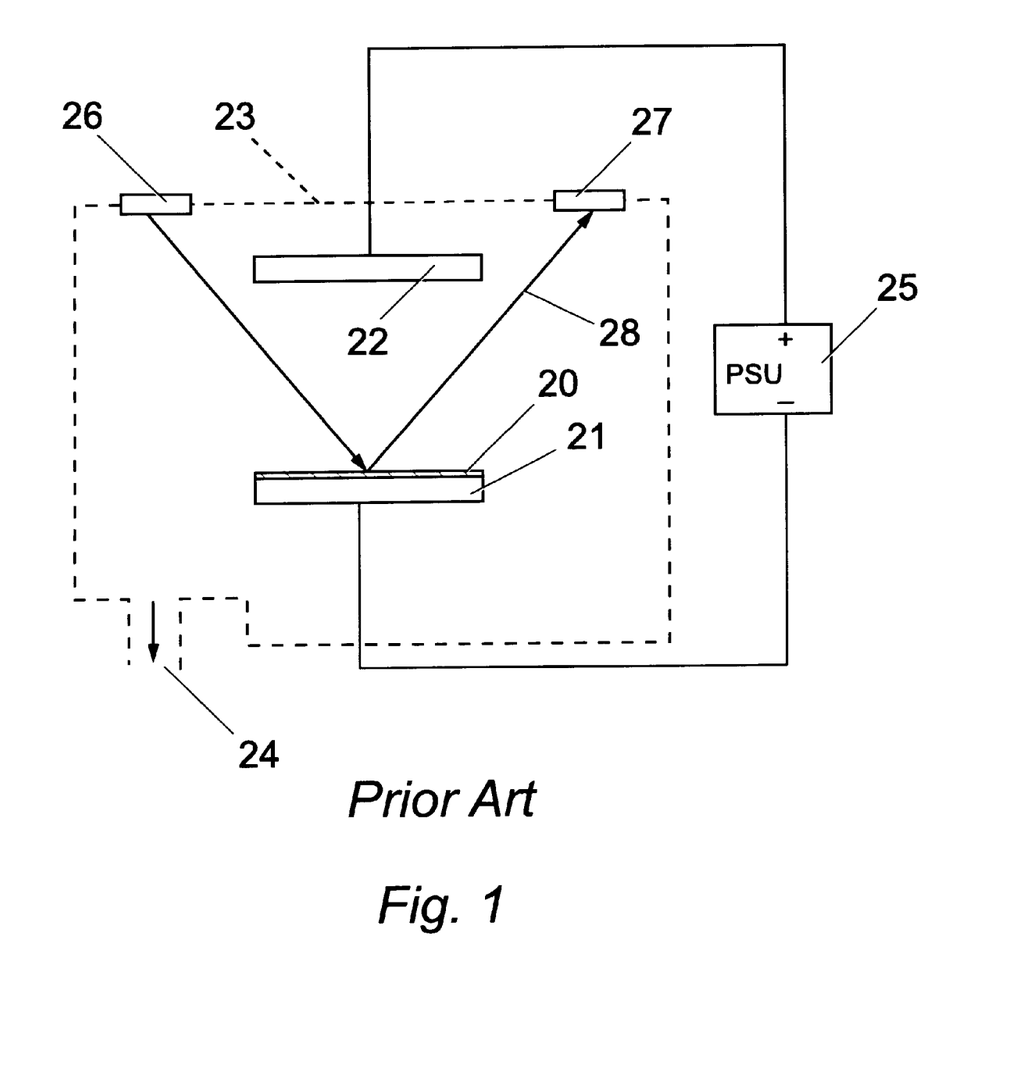
FIG. 1 illustrates a prior art film removal system.

Thin film deposition or removal requires either chemical or physical processes or a combination of the two and most frequently takes place under conditions off a partial vacuum. A typical film removal system to which the equipment and method of the current invention could be conveniently applied is depicted in FIG. 1.

The method of film removal depicted here is commonly referred to as dry etching or reverse sputter etching depending on the pressure level maintained during the process. The substrate 20 is placed on an electrode 21 which may be electrically isolated or part of the electrical ground of the system. A second electrode 22 is connected to the opposite polarity of a power supply unit 25. Commonly this is the positive polarity. The system is enclosed within a vessel 23 which is evacuated by a pumping means 24. The application of power from the power supply 25 ionises residual gas in a the vessel or alternatively additional gases may be introduced in order to modify the environment and the process. The ionized gases are attracted to the electrodes with the heavy positively charged ions impinging on the substrate 20 causing film removal by physical means and/or chemical means.

It will be readily observed from the foregoing description and the drawing that the introduction of any probe into the etch region will prevent ions from impinging on the whole substrate and, if the probe is metallic, disturb the electrical profile within the etch region to the detriment of the process. As such it is common and well known to introduce an optical signal which is reflected off the substrate and subsequently detected. A typical optical path is shown at 28 with access to and egress from the system made possible by transparent food through ports or windows 26,27. An alternative system is to provide a small window in the electrode 22 so that light can be directed at the substrate and reflected back along its own path.

Figure 2:
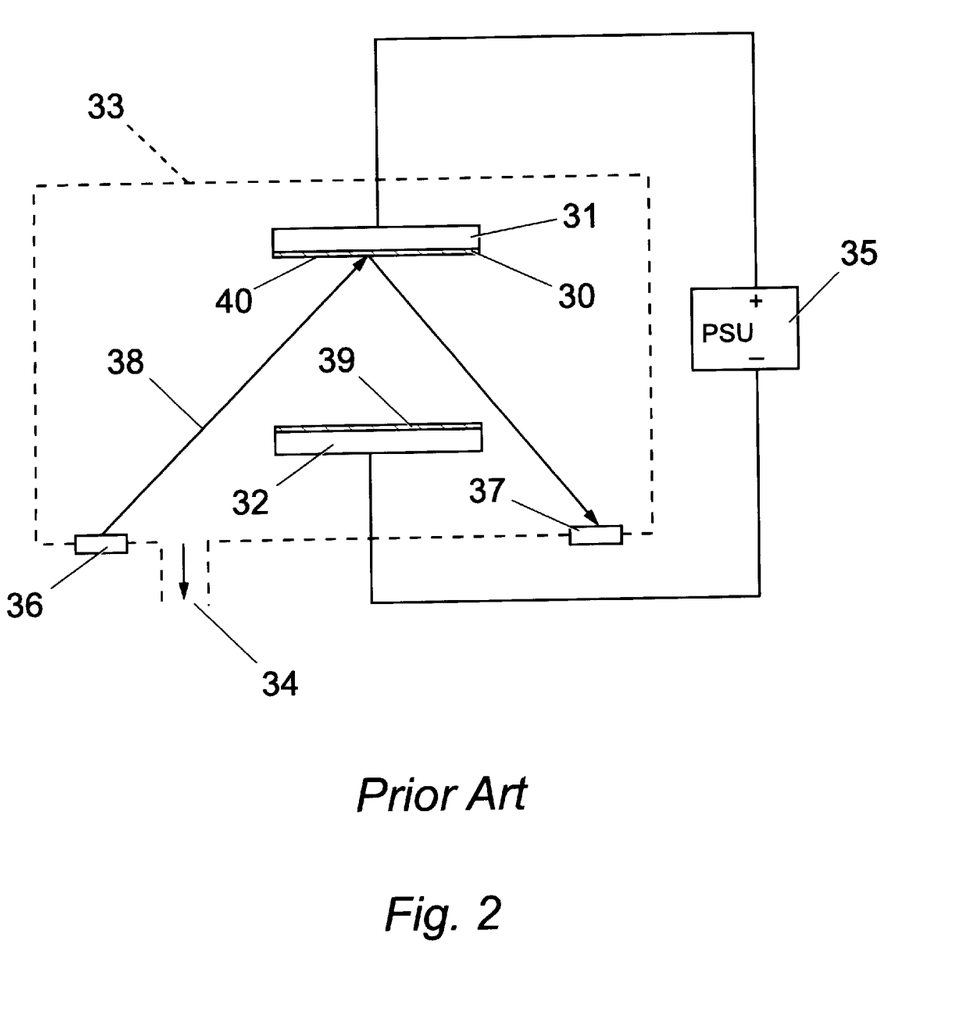
FIG. 2 illustrates a prior art film deposition system.

An alternative arrangement for deposition rather than removal of thin films is shown in FIG. 2.

The method of film deposition depicted here is commonly referred to as sputter deposition or plasma enhanced chemical vapour deposition depending on the pressure level maintained during the process. The substrate 30 is placed on an electrode 31 which may be electrically isolated or part of the electrical ground of the system. A second electrode 32 is connected to the opposite polarity of a power supply unit 35. Commonly this is the negative polarity. The system is enclosed within a vessel 33 which is evacuated by a pumping means 34. The application of power from the power a supply 35 ionises residual gas in the vessel or alternatively additional gases may be introduced in order to modify the environment and the process. The ionised gases are attracted to the electrodes with the heavy positively charged ions impinging on the chosen material to deposit 39 which is placed on or bonded to the electrode 32. Material is then deposited by physical or chemical or a combination of methods on the substrate 30. As a variant on this process there may be no deposition material 39, with the deposition occurring by a chemical combination of gases enhanced by the plasma.

As with the previous case, it will readily be seen that the introduction of a physical probe, such as may consist of a quartz crystal microbalance, into the deposition region will prevent depositing material from impinging on the whole substrate and, if the probe is metallic, disturb the electrical profile within the etch region to the detriment of the process. As such it is common and well known to introduce an optical signal which is reflected off the substrate and subsequently detected. A typical optical path is shown 38 with access to and egress from the system made possible by transparent feed through ports or windows 36,37. An alternative system is to provide a small window in the electrode 32 so that light can be directed at the substrate and reflected back along its own path. As an alternative if the substrate is transparent then a small hole can be introduced in the electrode 31 with light transmitted through the substrate.

Light that is introduced as described above reflects off the film that is being deposited or removed and the properties of the reflected light are modified (Ref Born and Wolf). Such modification will occur to the intensity of reflection and/or to the polarisation properties and these modifications will depend on the wavelength of the incoming optical radiation. Determination of the film thickness can be by reference to an existing reference standard (Ledger et al, EP 0 545 738 A2) or alternatively oscillations in reflected monochromatic light can be counted (Corlias, GB 2 257 507 A). These methods can be improved by the introduction of additional wavelengths (Canteloup et al, EP 0 735 565 A1) where the additional wavelengths, or indeed white light illurination with spectral analysis of the reflection, is used to remove anomalies in the identification of a particular oscillation extremum.

Figure 3:
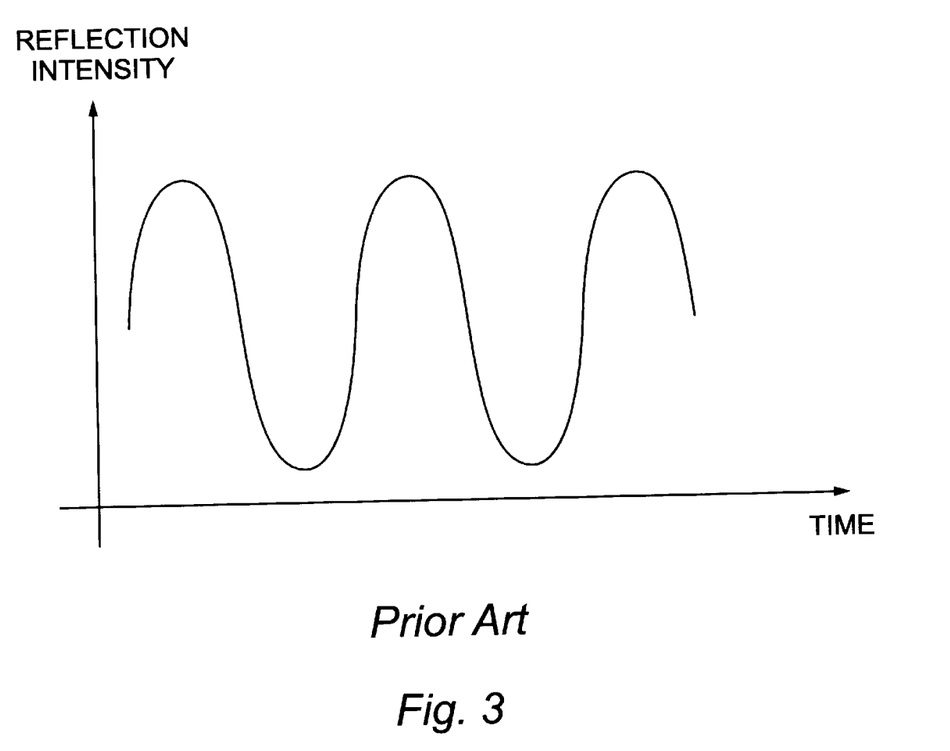
FIG. 3 depicts an idealised development of the reflection intensity waveform with change in film thickness, as assumed in the prior art.

Prior art assumes an idealized development of the reflection process (FIG. 3) with the change in film thickness between extrema in the reflection signal (50) occurring in a time ΔT being given by the relationship:

Δx=λ/(4μ)

where Δx is the change in film thickness occasioning the change in reflection level;

λ is the wavelength of the light used to probe the film thickness; and

μ is the refractive index of the material at the wavelength of light λ.

Figure 4:
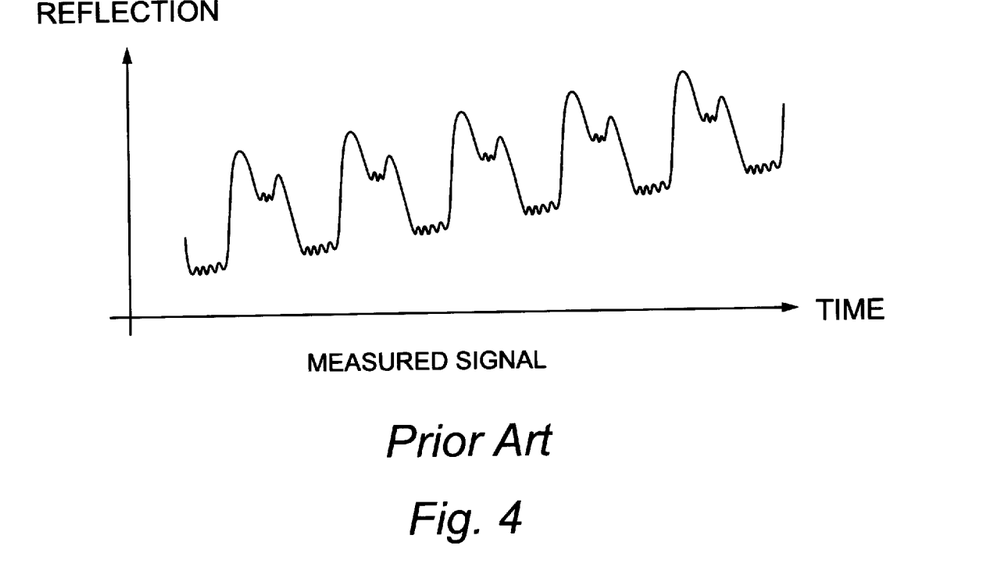
FIG. 4 depicts the same signal as typically occurring in practice.

In real situations the signal frequently does not meet this ideal and resembles the signal obtained and illustrated in FIG. 4.

Figure 5:
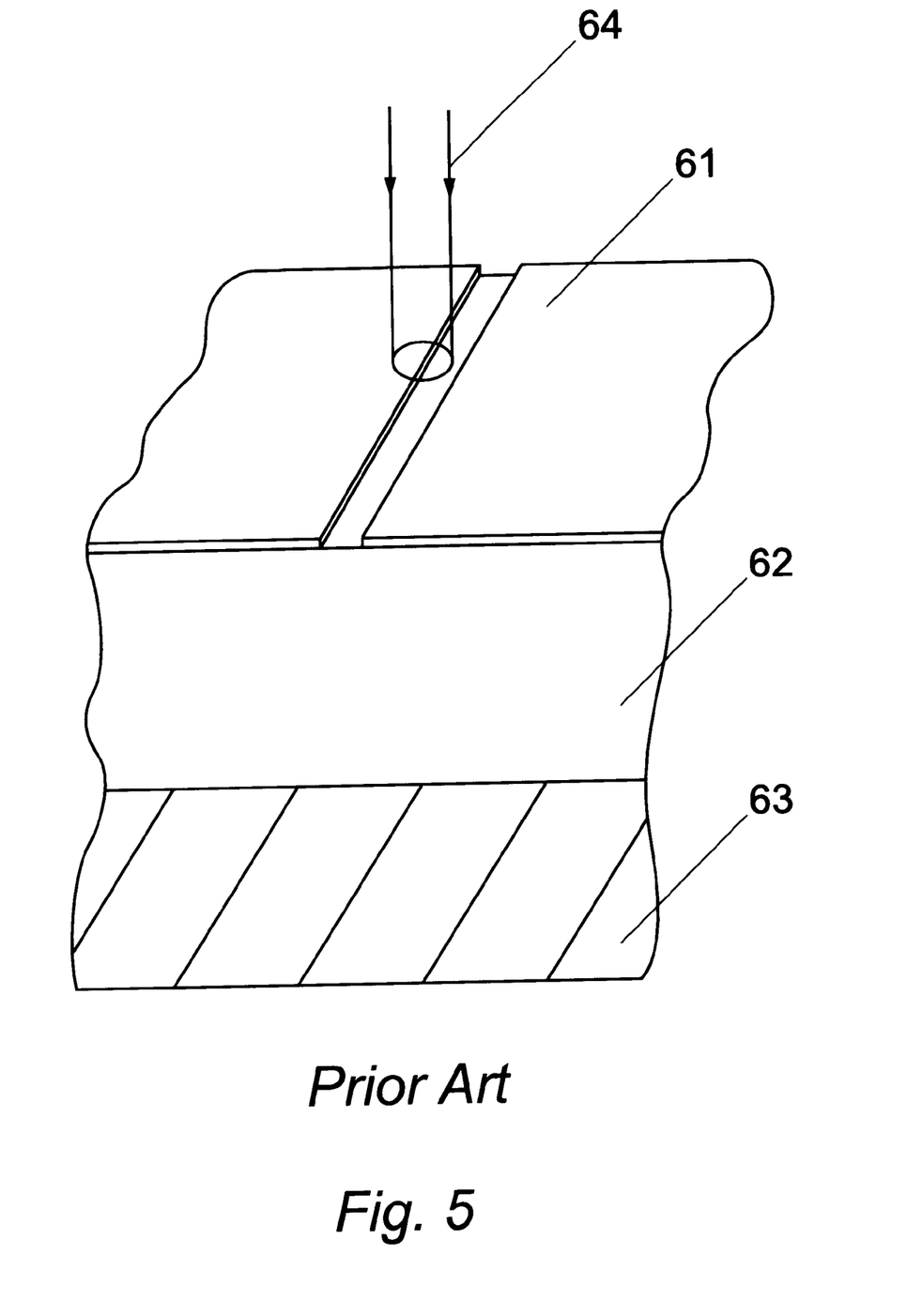
FIG. 5 shows a mask and film structure giving rise to the signal of FIG. 4.
Figure 6:
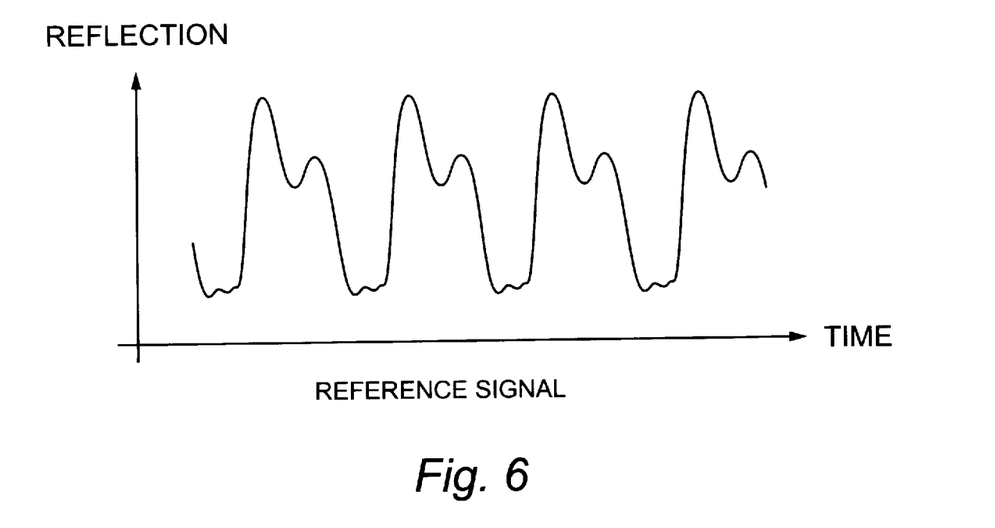
FIG. 6 shows an idealised reflection profile for the structure of FIG. 5.

The structure of the film giving this reflected signal during its etch is shown in FIG. 5. Here a metallic mask 61 is overlying a film of silicon oxide 62 on a silicon substrate 63 and the illumination beam 64 is such that both the mask 61 and the exosed film are illuminated. The idealised reflection profile (which can be calculated as discussed below) is shown in FIG. 6. By comparing the idealised situation (FIG. 6) with the practically experienced situation (FIG. 4) a number of features are apparent.

Firstly there is the presence of wide bandwidth noise.

Secondly there is a variation in the actual signal variation between extrema (from maxima to minima).

Thirdly the fine detail structure in the trough at each minimum has been completely masked.

It is the prime objective of this current invention to provide a signal processing means to optimise the acquisition of information from the signal of the type shown in FIG. 4.

SUMMARY OF THE INVENTION

The invention in its broadest form provides an apparatus and method for determining the thickness and variation of thickness with time of thin films during the process of their deposition, growth or removal, in situ, under process conditions. The invention comprises the steps of:

providing a means for reflecting or transmitting light through or from a thin film structure whilst that film structure is being processed to increase its thickness, decrease its thickness or otherwise change a property that relates directly or indirectly to its optical properties;

at each point in time constructing an algorithm for processing the changing optical signal by direct reference to a set of calibration data, such set of calibration data either having been previously acquired from a calibration run of the process or, preferably, generated from a physical model of the thin film structure's development with thickness; the defining essential of the algorithm being that it is not sensitive merely to signal level but is highly sensitive to development of the signal waveform shape with changing thickness; and providing a means for indication of rate of change of thickness (or other derived parameter) with time for indication and control together with a means for indication of thickness (or other derived parameter) with time for indication, control and cessation of the process.

In accordance with one embodiment of the invention a helium neon laser is arranged to reflect off a substrate that is covered with a thin film structure as in FIG. 1. The details of the thin film stack are well understood from the previous deposition stages and these details have previously been entered in to a computer programme which analyses the idealized modification of the reflected light with change in film thickness. The etch process time is now divided in to a series of epochs of time, the number and duration of the epochs being chosen by reference to the rate of change of shape and appearance of new features in the idealioed model. The idealised model falling within each epoch of time is now analysed for shape content by, conveniently, Discrete Fourier Transform analysis. The information arising from the shape analysis is now used for two purposes:

Firstly it is used to set up adaptive filters which are therefore tuned to the response expected to be required for the shape of the incoming signals during that epoch of time.

Secondly it is used to track conformance to the idealised signal shape by using techniques such as the correlation technique. The correlation technique will give a measure of match to the shape feature occurring within the particular epoch of time and therefore by reference to the idealized model thickness will be derived.

It will be apparent to the skilled reader that this method therefore eliminates DC signal drift, makes the system immune to variations in the distance between extrema, and the use of adaptively tuned filters helps detect fine features in the presence of large amounts of noise therefore maximising the data abstracted from the process to the benefit of the user.

DESCRIPTION OF SPECIFIC EMBODIMENTS

Figure 7:
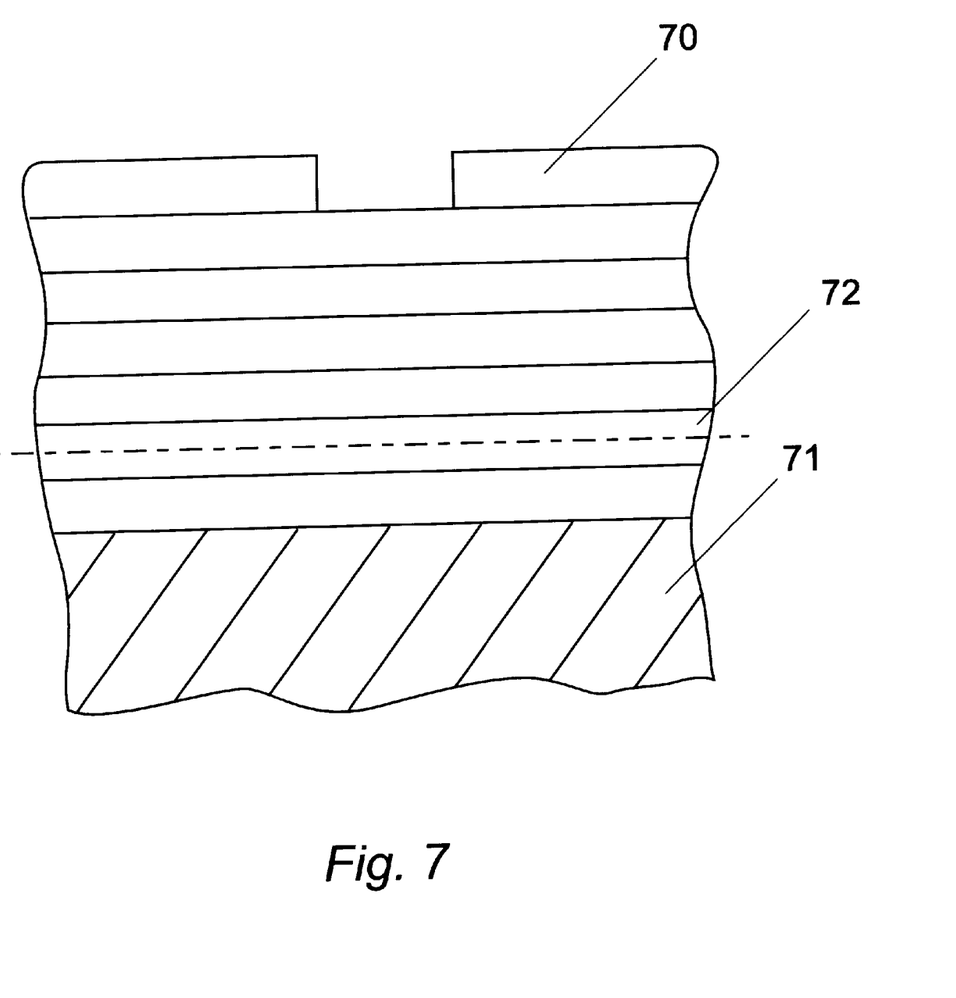
FIG. 7 illustrates a thin film structure to be etched by means of a first embodiment of the present invention.

Referring to FIG. 7, a thin film structure is to be etched half way through the thickness of the second layer (counting the substrate as layer 0). The thin film is to be defined in two dimensions by an overlying mask which provides protection for the areas covered by the mask. The mask material is conveniently made from a material that only etches slowly. In this specific embodiment the overlying mask 70 is constructed from photo-resist and the film is a six layer structure of gallium aluminium arsenide of different concentrations of aluminium overlying a gallium arsenide substrate 71. The objective of this specific embodiment is to terminate the etch process half way through the penultimate layer 72.

The first step is to construct a set of reference data. As discussed above, this is preferably accomplished by establishing the effective impedance of the structure as it is examined slice by slice with each slice being thin compared to the overall thickness of an individual layer. For example if the layer is 20 nm thick then the size of a slice may conveniently be 0.1 nm.

So the modelling process (Ref: "Reflectance modelling for in-situ dry etch monitoring of bulk $SiO_2$ and 3.5 multilayer structures", S. E. Hick, W. Parkes, J. A. H. Wilkinson and C. P. W. Wilkinson, 1994, JVST, B-12(6)3306) uses the standard transmission line theory which indicates that at the sending end of a transmission line terminated with a load impedance the impedance $Z_{in}$ is given by;

$$Z_{in}/Z_o = \{Z_L + Z_o \tan h(\gamma l)\}/\{Z_o + Z_L \tan h(\gamma l)\}$$

where $Z_o$ is the characteristic impedance of the line
$Z_L$ is the load impedance
$\gamma$ is the complex propagation constant
l is the distance along the transmission line
The reflection coefficient is given by $$\rho = \{Z_L - Z_o\}/\{Z_L + Z_o\}.$$

In the case of a film stack these equations become $$\{Z_{in}(l,m)\}/\{Z_o(l,m)\} = \{Z_L(m) + Z_o(m) \cdot \tan h(\gamma(m) \cdot l)\}/\{Z_o(m) + Z_L(m) \tan h((\gamma(m) \cdot l)\}$$

and $$\rho(l,m) = \{Z_{in}(l,m) - Z_{vac}\}/\{Z_{in}(l,m) + Z_{vac}\}$$

with $$\gamma(m) = 2\pi/\lambda \cdot j(n-jk)$$

and $$R(l,m) = |\rho(l,m)|^2$$

where m is the layer number with m=1 corresponding to the layer directly above the substrate, $Z_{vac}$ is the impedance of free space, n and k are the real and imaginary parts of the complex refractive index, R is the reflectance, and j is the square root of minus 1.

In order to iterate the model:

$$Z_L(m) = Z_{in}(X_m, m-1)$$

where $X_m$ is the thickness of layer m and $Z_{in}(X_o, 0)$ corresponds to the substrate.

Therefore the model calculates the reflectance from a wafer stack by considering the change in reflectance as a single thin slice is added to the structure. When the next thin slice is added the model considers the impedance of the first slice/substrate combination to be the impedance of the new combined "substrate". In this way the reflectance as a function of film thickness may be conveniently obtained for any combination of layers.

The currently considered preferred embodiment also contains a mask. This is modelled by considering the reflection coefficients of the masked and unmasked areas separately, The mask is also etched (although nomally the mask removal is much slower than the film) and this may be allowed for again by modelling as a function of thickness.

The result of the masked and unmasked areas is then added for each "slice" in order to obtain the reflection coefficient and thus the reflectance.

In this preferred embodiment (FIG. 8) the etching system consists of two parallel plate electrodes 80, 81 placed within an evacuated enclosure 82 which is evacuated by a pumping system 83. The evacuated system is then filled at low pressure with an etching gas appropriate to the chemistry of the structure. In this preferred embodiment this may be a freon such as methyl chloride.

Figure 8:
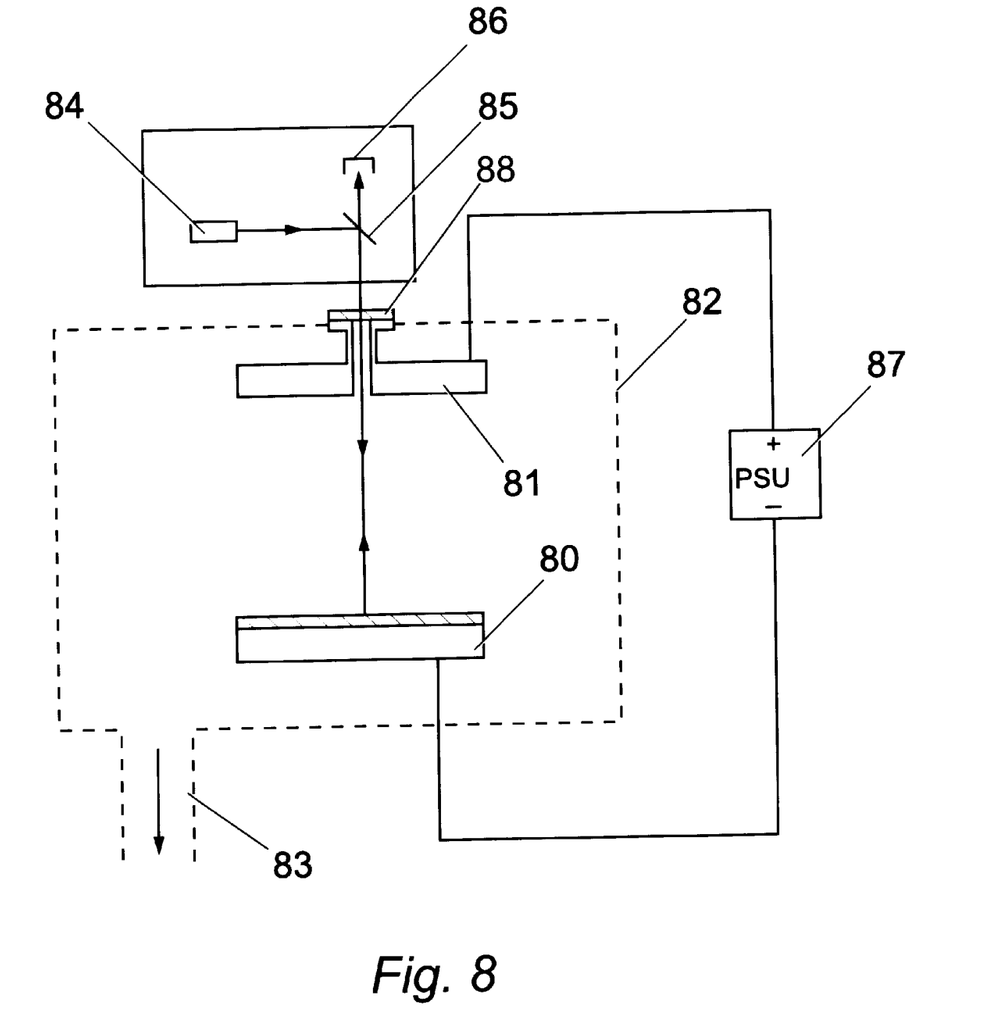
FIG. 8 is a schematic diagram of an etching system for caking out the first embodiment.

The substrate is placed on the bottom electrode 80 which may be connected to the ground of the system and then to the negative pole of a radio frequency source 87. In the preferred embodiment this is a source at 13.56 MHz. The top electrode 81 is connected to the positive pole of the RF source 87 and the application of power creates a plasma which etches material of the appropriate type placed on the bottom electrode 80. The top electrode 81 has a small window 88 formed in it. In the current embodiment the electrode 81 may be about 20 cm in diameter and the window about 1 cm in diameter and sealed with a transparent window of material such as quartz. In the preferred embodiment a helium neon laser 84 is then directed at the substrate by means of a beamsplitter 85 prepared in such a way that its reflectance and transmittance is 50%, The reflected beam then passes the beamsplitter and the intensity is sensed by a detector 86. In the preferred embodiment the detector 86 may be a silicon photodiode.

The invention may be operated with broad band light sources or narrow band light sources.

Figure 8A:
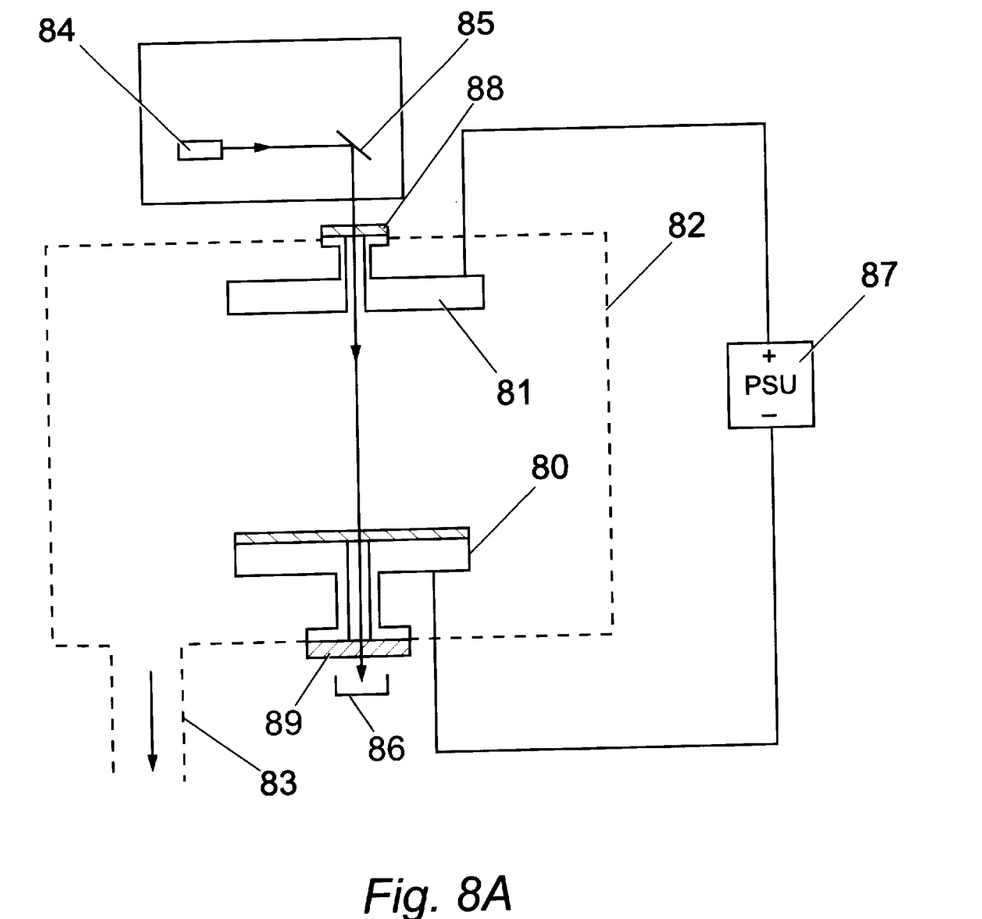
FIG. 8A is aschematic diagram of a mofication of the etching system of FIG. 8 in which transmittance through the substrate is employed.

FIG. 8A shows a modification of FIG. 8, like parts being denoted by like reference numerals. This embodiment relies on transmittance through the substrate, rather than reflectance from it. Accordingly, the bottom electrode 80 is provided with a window 89, and the detector 86 is positioned beneath the enclosure 82.

Figure 9:
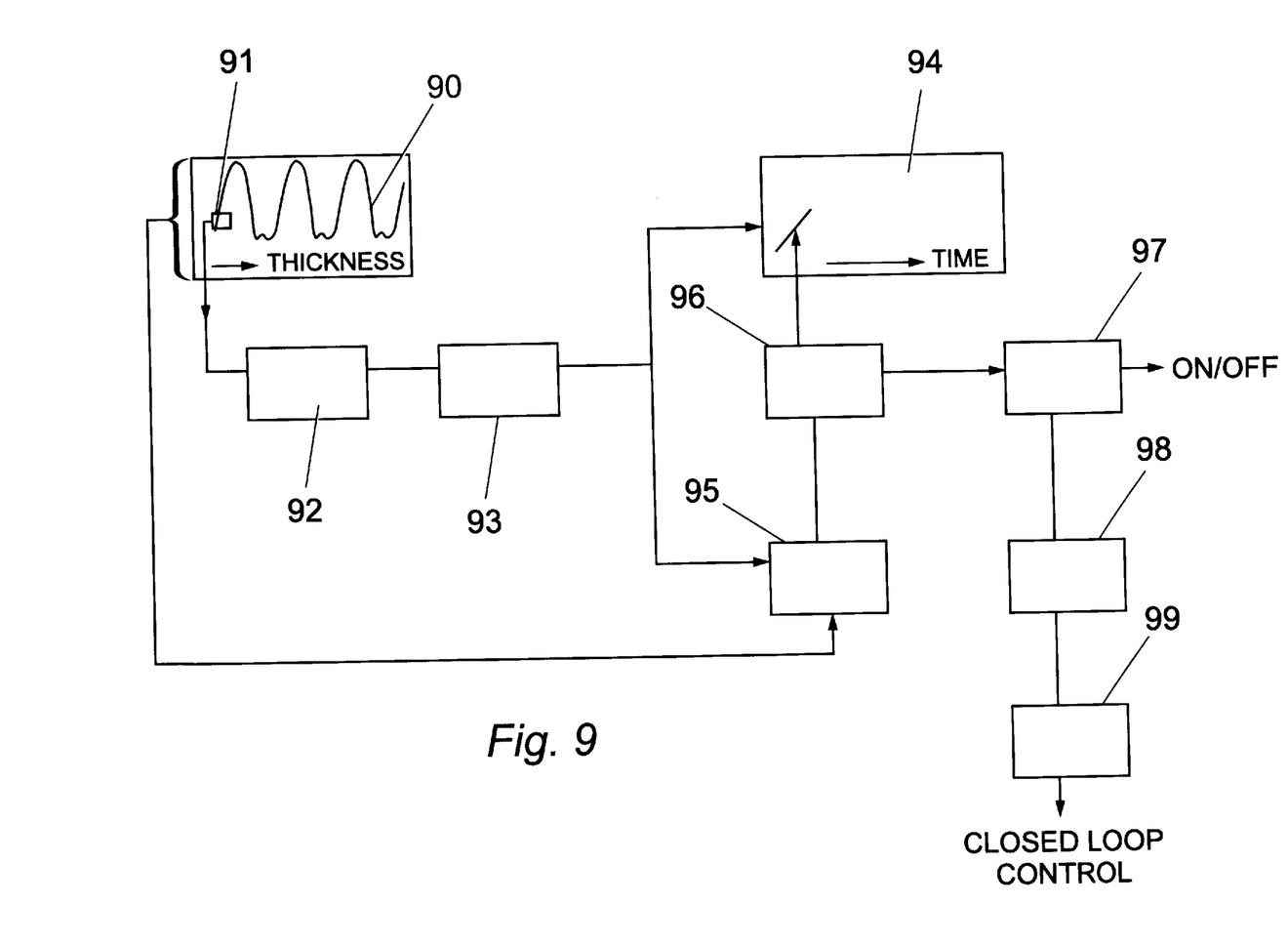
FIG. 9 is a flow chart illustrating data processing carried out in the first embodiment.

Referring to FIG. 9 which illustrates in flow-chart form the data processing carried out in the preferred embodiment, the idealized prediction of reflectance against thickness 90 is scanned by a data window 91 which, in the preferred embodiment, may be a data window extending to 1/3000 of the data size. The contents of the data window 91 are then passed to a software routine 92 that analyses frequency. In the preferred embodiment this is a Fast Fourier Transform. The output of the Fast Fourier Transform 92 is then used to construct an adaptive digital filter 93 that passes the frequencies present as being predicted to be present in the data window 91 and highly attenuates other frequencies. The output of the digital filter 93 is recorded as the processed signal against time 94. It is a principal objective of the current invention then to also use the digital filter 93 to carry out a shape recognition 95 as compared to the idealized prediction 90. In the preferred embodiment this shape recognition 95 may be accomplished by a correlation of the Fourier spectrum of the processed signal against the Fourier spectrum of the idealized signal. The output of the shape recognition 95 then yields a best match which is the thickness 96 at any point in time of the processed signal. This value is then compared at 97 to the target thickness to give a termination On/Off decision. Also this thickness value is compared at 98 to time to give a rate signal 99 which may be used for closed loop process control.

Figure 10:
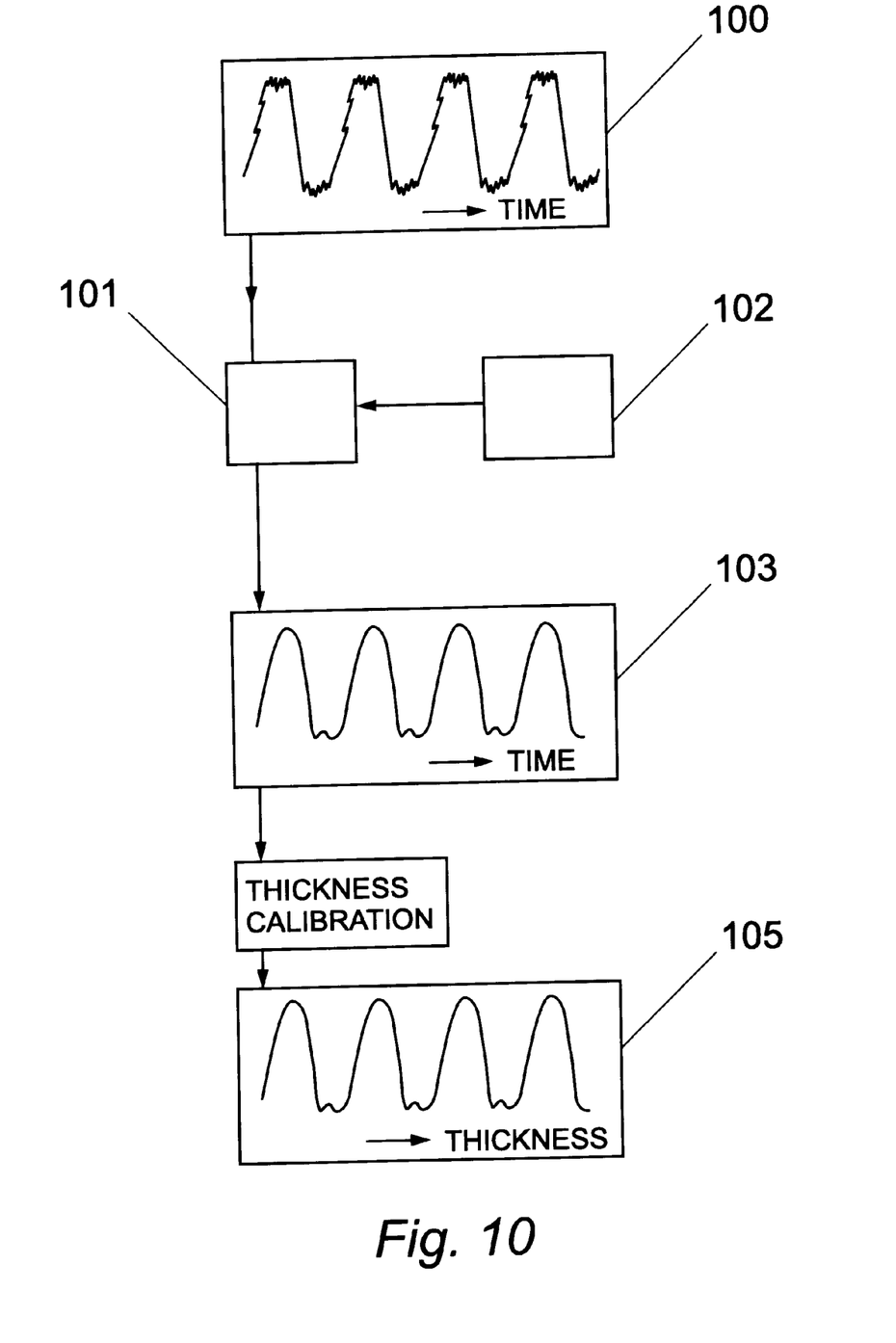
FIG. 10 illustrates a second embodiment of the present invention.

In a further specific embodiment, a thin film structure is to be terminated part way through the thickness of the layers but now there is inadequate knowledge of the layer structure to allow a full idealised signal to be produced by mathematical modelling. In this case application of the present invention is achieved by a calibration run. In FIG. 10 the un-processed signal output 100 of an etch of the structure is then processed by a digital filter 101 using filter parameters derived from keyboard entry 102. The output of the digital filter 103 is then compared to any predictive modelling or prior experience of film shape to ensure that representative features are present. This processed calibration run is then calibrated against thickness by an off-line technique such as stylus profiling. The resulting calibration data set 105 is then used in exactly the same way as the idealised signal data set 90 in the previous preferred embodiment.

Figure 11:
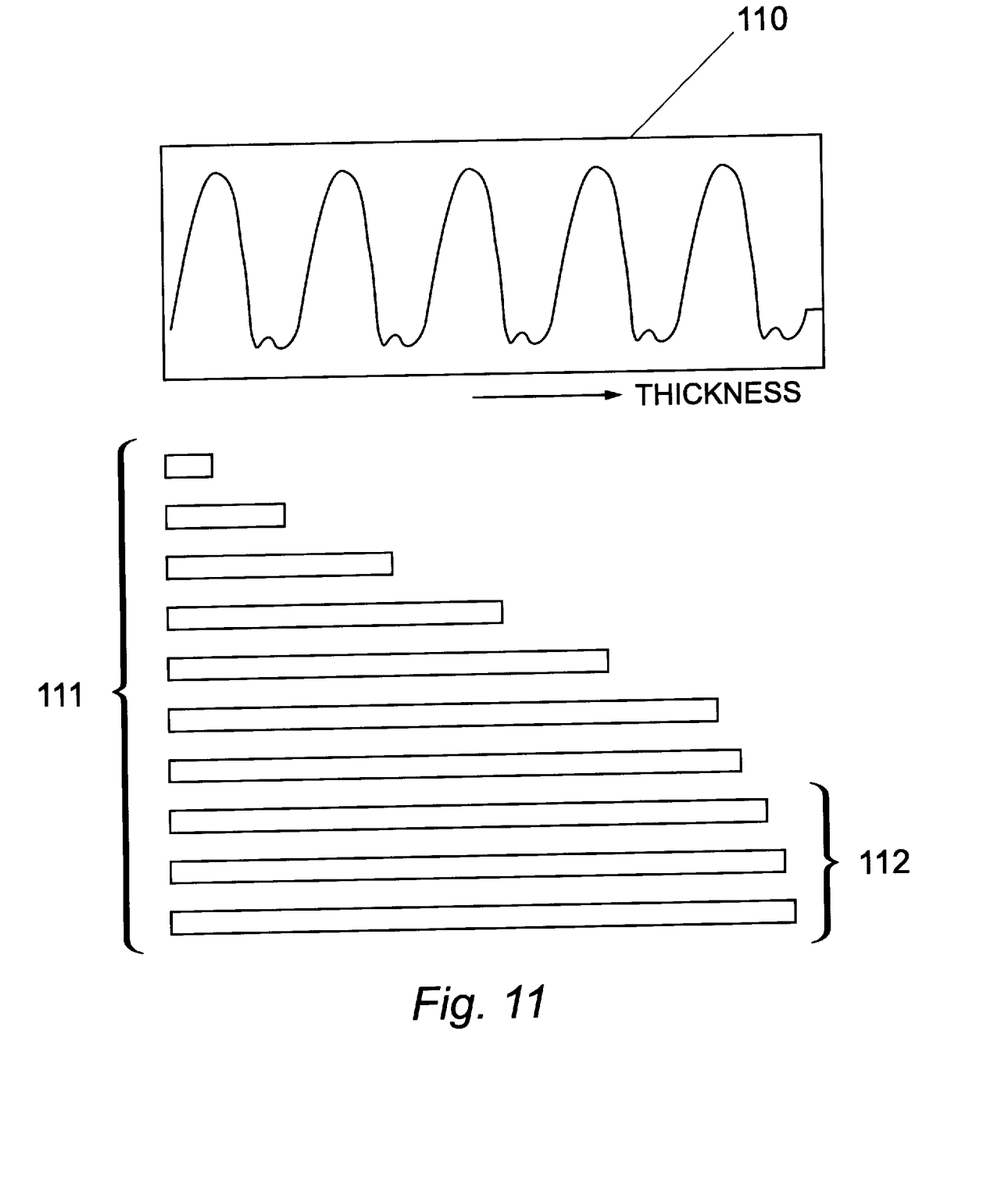
FIG. 11 shows a modified form of data comparison which may be used in the foregoing embodiments.

The skilled reader will understand that the method for analyzing frequencies may be of many different types such as cosine, sine or Laplacian methods. The skilled reader will also understand that the shape comparison technique may be achieved by many techniques including Laplace Transforms and Gradiometer Transforme. The data windows may also be of varying extent. FIG. 11 shows one method of using data windows of different extent. The data set 110 that is to be compared to, which may be an idealized data set resulting from a model or a calibration data set, is used in conjunction with a range of data windows 111. These data windows increase in length from one to the other so that if confidence of recognition of shape by a correlation technique using the Fast Fourier Transform or a Laplacian Technique, or application of any other shape recognition method such as the Gradiometer Transform, falls below a pre-defined minimum level then the subsequent increased size window may be used. Use of a data window of increased size has the advantage of allowing more data to be used to recognise features. It has the concomitant disadvantage that more data has to be present in the processed data stream to allow a meaningful comparison but, since the movement to a larger data window only occurs after more processed data has been already collected, this disadvantage has no impact on the availability of thickness data that is the goal of the present invention. Under circumstances where it is desirable for the confidence of fit to be very high, for example close to the target thickness for termination, it may be desirable to use data windows only varying by a very small amount from each other 112 and to automatically change from one data window to the subsequent one rather than waiting for an inadequate fit to be recorded.

Figure 12:
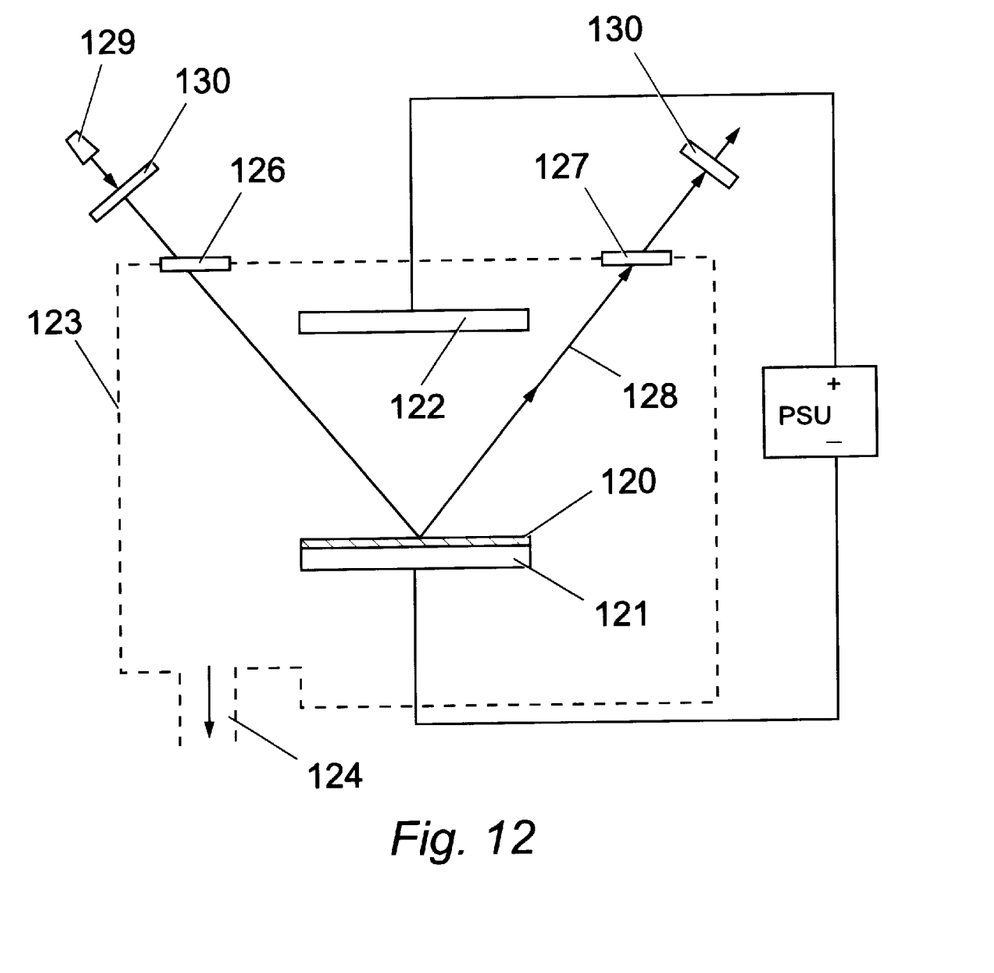
FIG. 12 shows a modified embodiment using polarisation to generate a measurement signal for processing.

In another preferred embodiment, FIG. 12 shows the incorporation of polarisation into the method. The light source 129 is either polarized or a polarising means 130 is used to ensure its polarization state. Upon reflection from the film stack the state of polarisation is changed in a way that can be modelled by application of transmission line theory or the analysis of transmission of radiation using matrices. Use of an analysing polariser 130 allows measurement of the changed polarisation state to derive a signal measurement. It will be apparent to the skilled reader that the signal measured is now polarisation state against time rather than reflectance against time.

What is claimed is:

1. A method for determining the thickness of thin films during the process of deposition or removal of those thin films that comprises the steps of:
   (a) illuminating the thin film with electromagnetic radiation;
   (b) detecting modifications in the property of radiation that has been reflected or transmitted by the film structure to generate a measurement signal;
   (c) producing a set of data predicting the signal behaviour in advance;
   (d) dividing the predicted signal behaviour into one or more sets of data windows and using the data windows of predicted signal behaviour to derive digital filters;
   (e) using the derived digital filters to process the measurement signal to form a processed acquired signal; and
   (f) using the processed acquired signal and the predicted signal behaviour together with shape recognition algorithms to derive a best estimate of film thickness during the process of film removal or deposition.

2. The method of claim 1, wherein the predicted data is derived by the application of iterations of reflections at an effective complex load impedance.

3. The method of claim 1, wherein the predicted data is derived by the application of matrix modelling to wave propagation through the film structure.

4. The method of claim 1, wherein the shape analysis is carried out by application of the Fourier Transform.

5. The method of claim 1, wherein the shape analysis is carried out by application of the Laplace Transform.

6. The method of claim 1, wherein the shape analysis is carried out by application of the Gradiometer Transform.

7. The method of claim 1, wherein the predicted signal behaviour is obtained by calibration using a calibration run of a film structure similar or identical to that which it is required to process.

8. The method of claim 1, wherein the data window size is not fixed but is changed dynamically depending on the detail of shape structure predicted to be present at any point in the process or is increased monotonically with time.

9. The method of claim 1, wherein the modification to the property of the incident radiation is polarisation.

10. The method of claim 1, wherein the modification to the property of the incident radiation is intensity.

11. The method of claim 1, wherein the illumination is broad-band and contains many wavelengths.

12. The method of claim 1, wherein the illumination is narrow band.

13. The method of claim 1, wherein the illumination is in the visible part of the spectrum.

14. The method of claim 1, wherein the illumination is in the ultraviolet part of the spectrum.

15. The method of claim 1, wherein the illumination is in the x-ray part of the spectrum.

16. The method of claim 1, wherein the illumination is at 90° to the plane of the substrate.

17. The method of claim 1, wherein the illumination is at less than 90° to the plane of the substrate and the angle is entered as a variation in the mathematical model to predict the idealised signal.

18. Apparatus for carrying out the method of claim 1, the apparatus comprising:
    means for illuminating a thin film structure with electromagnetic radiation while the structure undergoes deposition or removal;
    means for detecting modifications in the property of radiation that has been reflected or transmitted by the film structure to generate a measurement signal;
    computing means arranged to receive the measurement signal and to process it by:
       (a) forming a processed acquired signal by filtering the measurement signal using digital filters derived from a predicted signal behaviours divided into data windows, and
       (b) deriving a best estimate of film thickness during processing of the film structure by applying shape recognition algorithms to the processed acquired signal and the predicted signal behaviour.

* * * * *